United States Patent
Kirschner

(10) Patent No.: US 8,726,607 B1
(45) Date of Patent: May 20, 2014

(54) SWAY BRACE ASSEMBLY AND METHOD OF RESTRAINING PIPE RELATIVE TO A BUILDING STRUCTURE

(75) Inventor: Kraig A. Kirschner, Corona, CA (US)

(73) Assignee: Automatic Fire Control Incorporated, South El Monte, CA (US)

( * ) Notice: Subject to any disclaimer, the term of this patent is extended or adjusted under 35 U.S.C. 154(b) by 1858 days.

(21) Appl. No.: 11/563,581

(22) Filed: Nov. 27, 2006

(51) Int. Cl.
*E04C 5/00* (2006.01)
*E04B 1/98* (2006.01)
*F16L 3/08* (2006.01)

(52) U.S. Cl.
USPC .............. 52/713; 52/167.1; 248/62; 248/72

(58) Field of Classification Search
USPC .......... 52/698, 721, 167.1, 713, 714; 248/72, 248/58–62; 403/338; 138/107
See application file for complete search history.

(56) References Cited

U.S. PATENT DOCUMENTS

| | | | | |
|---|---|---|---|---|
| 2,744,706 A * | 5/1956 | Gerdy | ............................... | 248/60 |
| 3,321,161 A * | 5/1967 | Hirt | ............................... | 248/72 |
| 3,570,794 A | 3/1971 | Kirschner | ........................ | 248/74 |
| 4,019,705 A * | 4/1977 | Habuda et al. | .................. | 248/58 |
| 4,078,752 A * | 3/1978 | Kindorf | ........................... | 248/62 |
| 4,465,252 A * | 8/1984 | Donovan et al. | ................. | 248/60 |
| 4,570,885 A * | 2/1986 | Heath | .............................. | 248/72 |
| 4,697,770 A | 10/1987 | Kirschner | ........................ | 248/62 |
| 4,730,800 A * | 3/1988 | Engman | .......................... | 248/67 |
| 4,988,070 A * | 1/1991 | Hollinger et al. | .............. | 248/613 |
| 5,004,193 A | 4/1991 | Kirschner | ........................ | 248/59 |
| 5,007,603 A | 4/1991 | Kirschner | ........................ | 248/59 |
| 5,145,132 A | 9/1992 | Kirschner | ........................ | 248/59 |
| 5,295,646 A * | 3/1994 | Roth | ................................ | 248/58 |
| 5,740,994 A * | 4/1998 | Laughlin | ....................... | 248/68.1 |
| 5,947,424 A * | 9/1999 | Heath | .............................. | 248/58 |
| 5,967,480 A * | 10/1999 | Kirschner | ..................... | 248/300 |
| 6,099,191 A * | 8/2000 | Werner | .......................... | 403/24 |
| 6,131,859 A * | 10/2000 | Giuliano | .......................... | 248/62 |
| 6,334,285 B1 | 1/2002 | Kirschner | ........................ | 52/702 |
| 6,464,422 B1 | 10/2002 | Kirschner | ....................... | 403/24 |
| 6,508,441 B1 | 1/2003 | Kirschner | ........................ | 248/62 |
| 6,629,678 B1 | 10/2003 | Kirschner | ..................... | 248/228.6 |
| 6,749,359 B1 | 6/2004 | Kirschner | ....................... | 403/338 |
| 6,898,905 B1 * | 5/2005 | Kirschner | ..................... | 52/127.5 |
| 6,959,898 B1 * | 11/2005 | Laughlin et al. | ................ | 248/60 |
| 7,191,987 B2 * | 3/2007 | Heath | .............................. | 248/62 |
| 7,316,247 B2 * | 1/2008 | Thompson | ................. | 140/102.5 |
| 2004/0031896 A1 * | 2/2004 | Heath | ............................ | 248/317 |
| 2004/0146343 A1 * | 7/2004 | Kirschner | ..................... | 403/338 |
| 2005/0230569 A1 * | 10/2005 | Kirschner | ..................... | 248/74.1 |

* cited by examiner

*Primary Examiner* — Elizabeth A Plummer

(74) *Attorney, Agent, or Firm* — Novak Druce Connolly Bove + Quigg LLP

(57) ABSTRACT

A building structure includes a web joist having a beam element with a laterally extending flange and a depending flange. A sway brace is attached to the laterally extending flange using a plate clamp with fixed and opposed screw jaws to grip the flange. A pipe clamp having a circumferential body which can tighten to retain a pipe is arranged so that the axis of the pipe extends beneath the depending flange of the beam element. A link, pivotally mounted at each end, extends between an upper portion of the plate clamp and the pipe clamp. The plate clamp is locked in place, the pipe is moved to the proximity of the depending flange and the pipe clamp is locked as far from the plate clamp as possible.

1 Claim, 1 Drawing Sheet

SWAY BRACE ASSEMBLY AND METHOD OF RESTRAINING PIPE RELATIVE TO A BUILDING STRUCTURE

BACKGROUND OF THE INVENTION

The field of the present invention is bracing hardware for use in building structures for utility piping.

Building codes, as well as competent construction practice, require the securing of fluid lines and other utilities to the structure of the building to brace such lines against damaging movement resulting from seismic disturbances. Sway braces have been designed for securing numerous types of fluid supply piping. An example of such secured piping is fire control water sprinkler distribution pipes. When sprinkler systems are used in buildings, it is required that the water distribution pipes be adequately braced, so that, in the event of an earthquake, the pipes will not unduly sway relative to adjacent portions of the building and separate or produce excessive leakage at the pipe joints.

Various types of sway brace structures have been developed for the foregoing purpose. Examples of such brace designs are to be found in U.S. Pat. Nos. 3,570,794; 4,697,770; 6,508,441; and 6,629,678. Further, a number of devices may be employed for mounting such bracing to a structure. Examples are found in U.S. Pat. Nos. 5,004,193; 5,007,603; 5,145,132; 6,334,285; 6,464,422; 6,629,678; 6,749,359; and 6,898,905. A design of a pipe clamp used with such systems is found in U.S. Pat. Publication No. 2005/0230569. The disclosures of the aforementioned patents and patent publication are incorporated herein by reference.

Pipe used for utility purposes in construction, such as for fire sprinkler systems, comes in certain sizes and materials. These specified pipe sizes have nominal outside diameters which vary within specific mill tolerances. Such nominal sizes and the associated mill tolerances can differ based on pipe material such as steel, cooper and plastic and on pipe nominal diameter. Hardware applied to such utility pipe of these various specified sizes is frequently designed specifically for a specified size and identified as such. The design of such hardware contemplates the nominal dimensions and, where necessary, the tolerances thereof. Thus, there can be a specific relationship and fit achieved by such hardware which is defined by the nominal dimensions within tolerance limits of any given specified utility pipe size for which the hardware is made.

Building construction frequently uses steel web joists. Such devices employ two beams. The beams are mutually parallel and spaced apart to create a large moment of inertia for the joist. Cord elements extend at angles between the two so the beams will act as one in bending. Each beam includes a set of two elongated angle elements, or angle iron members, which are also mutually parallel. The cord elements extend for anchoring to between the elongated angle elements which form a cord space to receive the elements. Each angle element includes two legs extending at a right angle to one another, a first leg which is parallel with the first leg of the other angle element to define the cord space and a second leg extending in the opposite direction from the second leg of the other angle element. The legs of this building structure define flanges which may be used to attach sway brace structures.

FIG. 1 illustrates a prior art sway brace assembly. The assembly includes a pipe clamp 10 to attach to a utility pipe 12. The clamp has a circumferential body with flanges 14 which are held toward one another by a bolt 16. A linking assembly is attached to the pipe clamp 10 by the bolt 16. The linking assembly includes a pipe 18 with brackets 20, 22 at the ends. The bracket 20 pivotally attaches to a building structure while the bracket 22 pivotally attaches to the pipe clamp 10. This device can be employed when a close connection between the pipe clamp 10 and the building structure is not required.

It is frequently desirable to mount the utility pipe as close as possible to the building structure. Use of a conventional plate clamp 24 with a conventional pipe clamp 26 pivotally mounted to it by a pivot mounting 28 has been proposed where a close positioning between the constrained pipe and the beam of the trust joist is of interest. However, the building structure is not predictably uniform and can create difficulties when the structure is askew with the utility pipe in a close fit environment.

SUMMARY OF THE INVENTION

The present invention is directed to method and apparatus for the restraining of pipe to avoid damaging movement resulting from seismic disturbances.

In a first separate aspect of the present invention, a web joist having an element with a laterally extending flange and a depending flange provides mounting for a plate clamp with opposed jaws defining a mouth to receive the laterally extending flange of the web joist. A pipe clamp includes a circumferential body having an axis therethrough extending beneath the depending flange of the web joist. A link pivotally mounted between the plate clamp and the pipe clamp allows a pipe in the pipe clamp to extend immediately adjacent the depending flange.

In a second separate aspect of the present invention, a web joist having an element with a laterally extending flange and a depending flange provides mounting for a plate clamp with opposed jaws defining a mouth to receive the laterally extending flange of the web joist. A pipe clamp includes a circumferential body having an axis therethrough extending beneath the depending flange of the web joist. A short link pivotally mounted between the plate clamp and the pipe clamp allows a pipe in the pipe clamp to extend immediately adjacent the depending flange. The link is attached to the plate clamp toward the top of the clamp to create a greater angle between the extension of the link and the extension of the mouth of the plate clamp.

In a third separate aspect of the present invention, a method for restraining a pipe employs a plate clamp, a pipe clamp and a link there between. The pipe clamp and plate clamp are located on a pipe to be restrained and on the building structure, respectively. The plate clamp is locked to the building structure and the pipe is moved as close to the plate clamp as possible. The pipe clamp is then locked on the pipe to be restrained as far from the plate clamp as possible with the pipe moved as close to the plate clamp as possible.

In a fourth separate aspect of the present invention, any of the foregoing aspects are contemplated to be combined for greater advantage.

Accordingly, an object of the present invention is to provide an improved sway brace assembly and an improved method for restraining a pipe in a building structure. Other and further objects and advantages will appear hereinafter.

DETAILED DESCRIPTION OF THE PREFERRED EMBODIMENT

Figure 1:
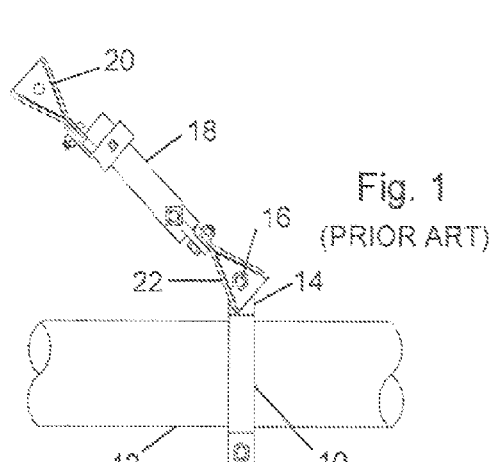
FIG. 1 is a side view of a prior art sway brace associated with a pipe.
Figure 2:
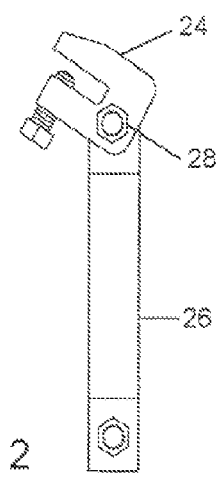
FIG. 2 is a side view of another prior art sway brace.
Figure 3:
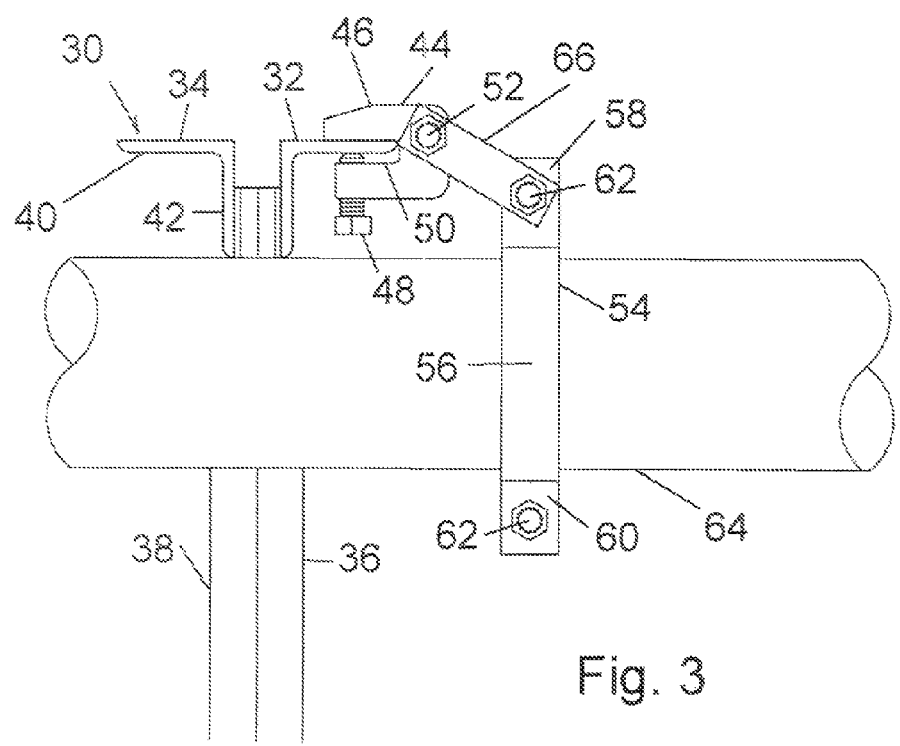
FIG. 3 is a side view of a sway brace assembled with a web joist and a pipe.

Turning in detail to the drawing, a building structure is shown to include a web joist 30. Web joists typically employ two composite beams. The upper beam is illustrated in FIG. 3 as including a set of two elongate angle elements 32, 34 which are mutually parallel. The second beam (not shown) is typically the mirror image of the illustrated beam. The beams are mutually parallel and spaced apart to create a large moment of inertia for the joist. Cord elements 36, 38 extend at angles between the two beams so that the beams will act as one in bending. The cord elements extend for anchoring to between the elongated angle elements which form a cord space to receive the elements. Each angle element 32, 34 includes two legs extending at right angles to one another. One leg forms a laterally extending flange 40 while the other forms a depending flange 42.

A sway brace assembly is attached to the building structure at the laterally extending flange 40. This sway brace assembly includes a plate clamp 44 which has a fixed jaw 46 and an opposed screw jaw 48. The two jaws 46, 48 define a mouth 50 there between which receives the laterally extending flange 40. The plate clamp 44 further includes a pivot mounting 52 which is principally in the part of the plate clamp 44 above the mouth 50, i.e., on the opposite side of the mouth 50 from the depending flange 42 when assembled. The pivot mounting 52 conveniently includes a hole through the body of the plate clamp 44 with a bolt extending therethrough.

A pipe clamp 54 is defined by two elongate and formed bars with each bar including an arcuate section 56, a first flange 58 at one end of the arcuate section 56 and a second flange 60 at the other end of the arcuate section 56. Each of the flanges 58, 60 on each of the bars includes a through hole (hidden) for receipt of a fastener 62 which is conveniently a bolt and nut. The fasteners 62 retain the flanges and cause them to move forcefully toward one another for clamping of a pipe. The bars thus form a circumferential body defining a circular passage therethrough having an access for receipt of a utility pipe 64. Breaks in the circumferential body between mating flanges 58, 60 provide for tightening for retention of the pipe 64.

A link 66 extends between the plate clamp 44 and the pipe clamp 54 and is pivotally mounted to each using the pivot mounting 52 and the fastener 62. This link 66 is conveniently a simple strap with a through hole adjacent each end. The link 66 is short. By using a short link 66, the pipe clamp 54 is kept near the plate clamp 44 as well as the pipe 64 remaining immediately adjacent the depending flange 42. The link 66 accommodates variations in relative orientation between the flanges 40 and 42 and the pipe 64 which could, without the link 66, prevent attachment of there between. The pivot mounting 52 of the plate clamp 44 is elevated to near the top of the plate clamp 44 as seen in FIG. 3. With the location of the pivot mount 52 and the short length of the link 66, the extension of the link 66 is at an angle to the plane of the laterally extending flange 40. This increases the resistance of the plate clamp 44 to being pulled from the flange 40 even if the screw jaw 48 is inadequately tightened.

Turning to the installation of the sway brace assembly, the method for restraining a pipe relative to a building structure is employed. The plate clamp 44 is located on the laterally extending flange 40 and the pipe clamp 54 is mounted about the pipe 64. The plate clamp 44 is locked by tightening the opposed screw jaw 48 against the flange 40 with the plate clamp 44 fully advanced onto the flange 40 as shown in the Figure.

The pipe 64 is moved as close as practicable toward the depending flange 42 with the axis of the utility pipe 64 extending beneath that depending flange 42. With the pipe 64 in the appropriate position toward the flange 42 and the plate clamp 44 locked in place, the pipe clamp 54 is positioned as far as possible from the plate clamp 44 and locked in place. Upon releasing the pipe, it will then remain immediately adjacent, i.e., as close as practicable, to the lower edge of the depending flange 42. Because of give in the assembly, it is difficult to achieve a final position of touching the pipe 64 with the depending flange 42 once the pipe is no longer forced to the edge of the flange 42. However, this procedure will result in the pipe 64 being at least immediately adjacent the bottom of the depending flange 42.

As assembled, the sway brace assembly is then prepared to take on dynamic loads resulting from movement of the pipe 64 relative to the web joist 30 during seismic activity. Through the employment of the link 66, variations in the placement and relative arrangements of the laterally extending flange 40 of the web joist 30 and the utility pipe 64 can be accommodated with minimal linkage.

Thus, an improved sway brace assembly and an improved method for supporting a pipe in a building structure have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A method for restraining a pipe relative to a web joist having an element with a laterally extending flange and a depending flange using a plate clamp, a pipe clamp and a unitary strap there between, comprising the steps of
   locating the pipe clamp on the pipe;
   locating and locking the plate clamp to the laterally extending flange;
   locating the pipe to traverse underneath and as close to the depending flange as possible;
   locking the pipe clamp on the pipe as far from the depending flange as possible with the pipe moved as close to the depending flange as possible.

* * * * *